United States Patent [19]
Goldman

[11] 3,735,255
[45] May 22, 1973

[54] APPARATUS AND METHOD FOR TESTING A MULTI-TERMINAL LOGIC CIRCUIT CAPABLE OF DETECTING FIXED AND INTERMITTANT FAULTS

[76] Inventor: Alvin Goldman, 190 East 72nd Street, New York, N.Y. 10021

[22] Filed: Aug. 6, 1971

[21] Appl. No.: 169,620

Related U.S. Application Data

[63] Continuation-in-part of Ser. No. 816,244, April 15, 1969, abandoned.

[52] U.S. Cl. ................................................324/73 R
[51] Int. Cl. .............................................G01r 15/12
[58] Field of Search ....................................324/73 R

[56] References Cited

UNITED STATES PATENTS

| | | | |
|---|---|---|---|
| 3,143,702 | 8/1964 | Kohler et al. | 324/73 R |
| 3,286,175 | 11/1966 | Gerbier et al. | 324/73 R |

OTHER PUBLICATIONS

Wood, J., First Alarm Indicator; IBM Tech. Bull.; Vol. 3; No. 7; Dec. 1960; pp. 18–19.

Cargile, W., A Computer–Controlled System etc.; Hewlett Packard Jour.; March 1969; pp. 14–20.

*Primary Examiner*—Robert J. Corcoran
*Attorney*—Ryder, McAulay & Hefter

[57] ABSTRACT

A programmed test arrangement for electronic assemblies compares the output of an array (generally of integrated circuits) to be tested against either the output from another similar array or a model output. Circulating shift registers containing the test data provide a sequence of two state test signals. These test signals together with various unchanging signals are connected as inputs to the arrays. The registers are loaded in accordance with a program that is a function of the circuit being tested.

Fixed and intermittent faults on the electrical arrangement under test are identified by particular patterns of fault indications generated responsive to the two state logic output signals. The test data cycled through the circulating registers is a function of the type of array to be tested. The fault indicated is a function of the error in the particular array being tested.

8 Claims, 10 Drawing Figures

INVENTOR.
ALVIN GOLDMAN

INVENTOR.
ALVIN GOLDMAN

Patented May 22, 1973

| STATE | | 1 | 2 | 3 | 4 | etc. |
|---|---|---|---|---|---|---|
| TERMINAL | | | | | | |
| INPUTS | C | 1 | 0 | 0 | 1 | |
| | F | 0 | 0 | 1 | 1 | |
| | G | 1 | 1 | 1 | 1 | |
| | J | X | X | X | X | |
| | R | 1 | 1 | 0 | 0 | |
| | Z | 0 | 0 | 0 | 0 | |
| OUTPUTS | AA | 0 | 0 | 1 | 1 | |
| | AC | 1 | 0 | 0 | 0 | |

| | FIG.1 | | | | |
|---|---|---|---|---|---|
| | | | | FIG.6 | |
| FIG.2 | FIG.3 | FIG.4 | FIG.5 | | |

INVENTOR.
ALVIN  GOLDMAN

BY
Davis, Hoxie, Faithfull & Hapgood
ATTORNEYS

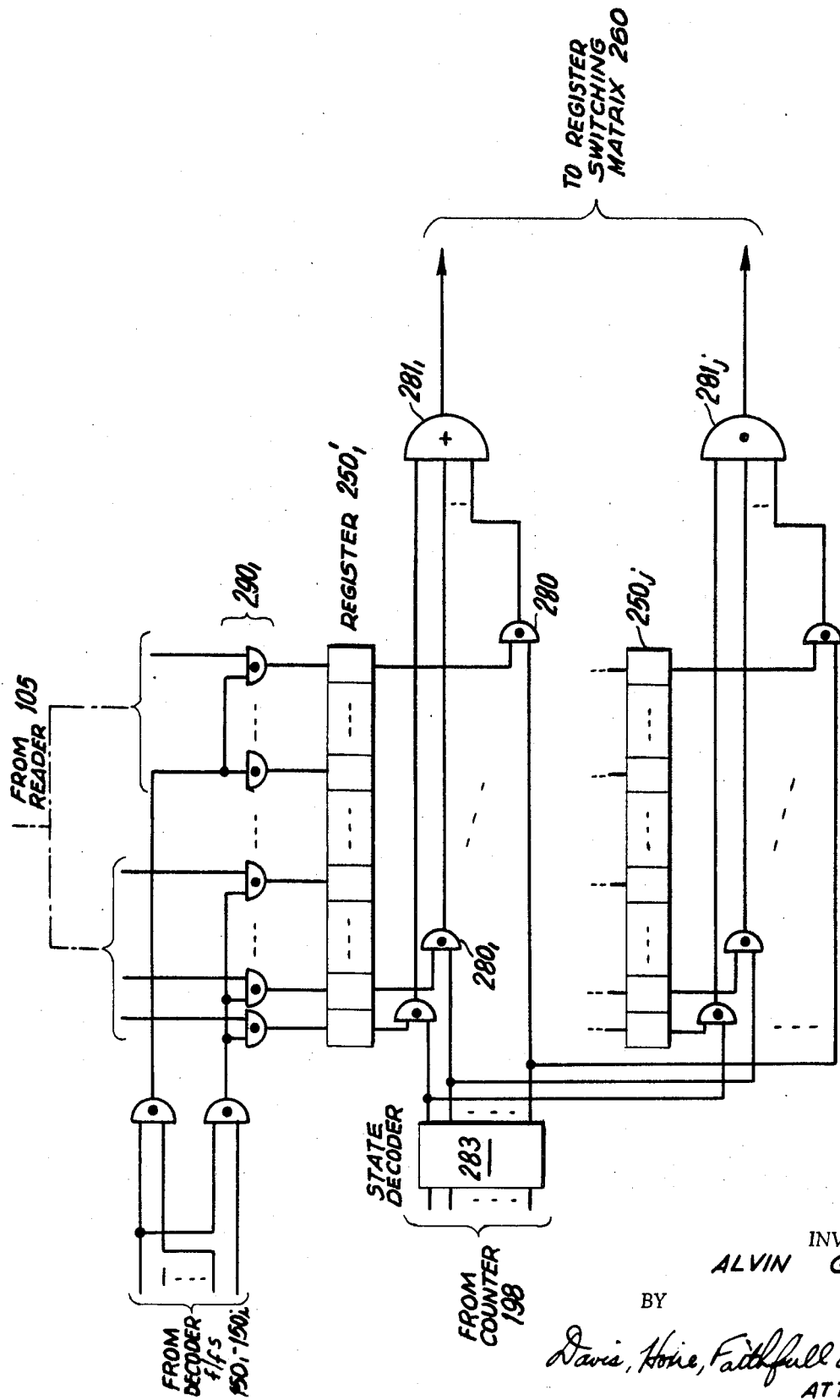

APPARATUS AND METHOD FOR TESTING A MULTI-TERMINAL LOGIC CIRCUIT CAPABLE OF DETECTING FIXED AND INTERMITTANT FAULTS

CROSS REFERENCE TO RELATED APPLICATION

This is a continuation-in-part of a patent application Ser. No. 816,244, now abandoned, which patent application was filed Apr. 15, 1969 and entitled: Programmed Dynamic Electronic Array Testing Apparatus.

This invention relates to electronic test equipment and, more specifically, to a flexible, programmed arrangement for testing arrays of interconnected electrical components.

BACKGROUND OF THE INVENTION

Much present-day electronic equipment is formed of modular arrays of electrically connected active and passive circuit components. Computers, instrumentation, control, communication and other functional electronic apparatus typically include many circuit boards or other substrates having an array (that is, plurality) of integrated circuit packages mounted thereon. The integrated circuit packages, in turn, vary from simple electrical gates and logic networks to medium and large scale integrated functional arrays, e.g., counters, multivibrators, flip-flops, shift registers, arithmetic elements, data converters and encoders, multiplexers, amplifiers, and the like. Printed circuit boards are of varying complexity, some containing one hundred and fifty or so interconnected integrated circuits and various resistive and reactive impedances, with over one hundred terminals being required to communicate signals and actuating voltage levels to and from some boards.

These integrated circuit arrays which make up a composite modular printed circuit board represent a considerable investment, and are employed in relatively large quantities. However, a fair number of completed boards are found after manufacture to be defective and unacceptable for use. The defects comprise printed wiring or connector faults, or more usually, inoperative or partially inoperative integrated circuits. Moreover, these integrated circuit faults may be intermittent and, possibly also, arise responsive to a specific signal sequence under dynamic signaling conditions.

It is not unusual for integrated circuit manufacturers or customers to check the individual integrated circuit packages themselves, as by applying a constant voltage to the signal input leads and verifying that the proper output signals have been developed. However, no completely satisfactory apparatus has heretofore been available for checking modular interconnected electronic arrays.

It is therefore an object of the present invention to provide an improved arrangement for testing modular electronic assemblies.

More specifically, an object of the present invention is the provision of an electronic test apparatus for isolating and identifying continuous and/or intermittent faults occurring in an interconnected array of integrated circuit packages.

It is another object of the present invention to provide an electronic test arrangement which is programable to check differing electronic assemblies, i.e., wherein any electronic modular array may be accommodated by simply employing a corresponding program to control the testing equipment.

SUMMARY OF THE INVENTION

These and other objects of the present invention are realized in a specific illustrative testing arrangement which includes programable apparatus, and sockets for holding and effecting electrical connections to two like printed circuit boards having identical arrays of integrated circuit packages thereon.

A plurality of binary words are stored in a plurality of synchronously clocked circulating storage registers. The word in each register having the same number of bits as any other register. The outputs of the registers are applied via a program controlled input-output connector switching matrix to corresponding input signal terminals of the two boards being compared. Typically, the bits are applied to the test boards at an operational rate in the megacycle range. Similarly, the output signal terminals on the boards are connected by a connector switching matrix to fault readout and display circuitry. A single test cycle is a single cycle through all the bits in the words stored in the plurality of registers.

A fault in the connections on the board or in an integrated circuit package thereon is indicated when corresponding output terminals on the two boards being compared exhibit differing voltage conditions. A display is developed to identify the particular test operation and output terminal giving rise to the fault, and structure is provided to permit an operator to conduct further tests to isolate the problem, e.g., to identify a specific package or lead as being defective. Thus, the expensive and complex board may be easily repaired rather than being discarded.

Counter apparatus is employed to record the number of faults and the number of test runs to indicate any intermittent condition.

The group of registers provides a succession of test states. A test state herein shall be understood to mean the set of bits supplied at a given moment by the group of registers. To test for intermittent faults, the programmed contents of the registers are cycled repetitively, perhaps ten thousand times. The apparatus of this invention responds by indicating the earliest test state in a cycle at which a fault occurs. As the cycles are repeated, the fault indicator will jump to an earlier test state if a fault occurs on a later cycle at a test state in the cycle that is earlier than the test state at which a fault occurred in an earlier cycle.

BRIEF DESCRIPTION OF THE DRAWINGS

A complete understanding of the present invention, and of the above and other features, objects and advantages thereof may be gained from a consideration of the following detailed description of an illustrative embodiment thereof, presented hereinbelow in conjunction with the accompanying drawing, in which:

FIG. 9 is a schematic diagram of an alternative circulating register arrangement.

DESCRIPTION OF THE PREFERRED EMBODIMENTS

Figure 5:
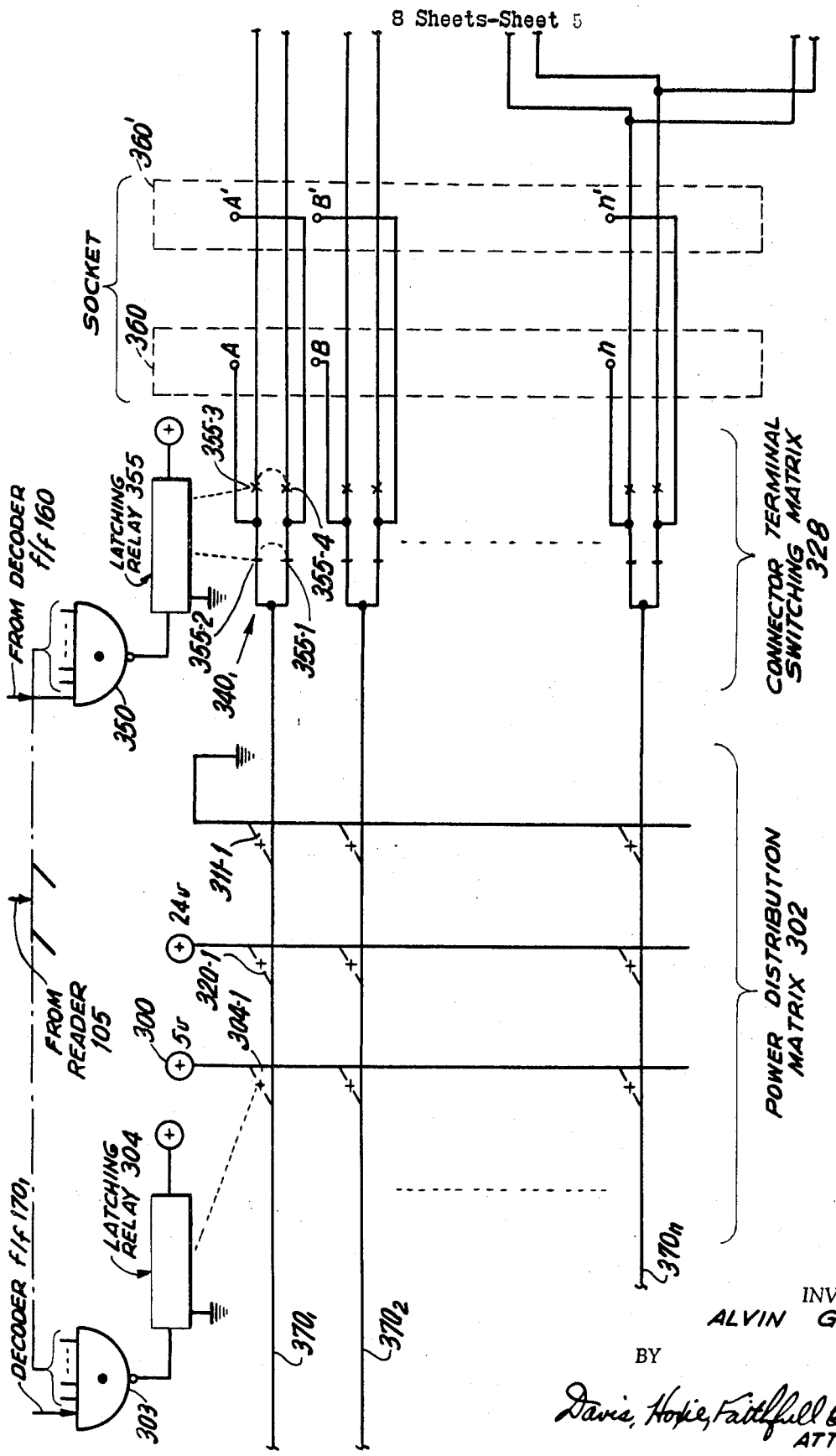
Figure 6:
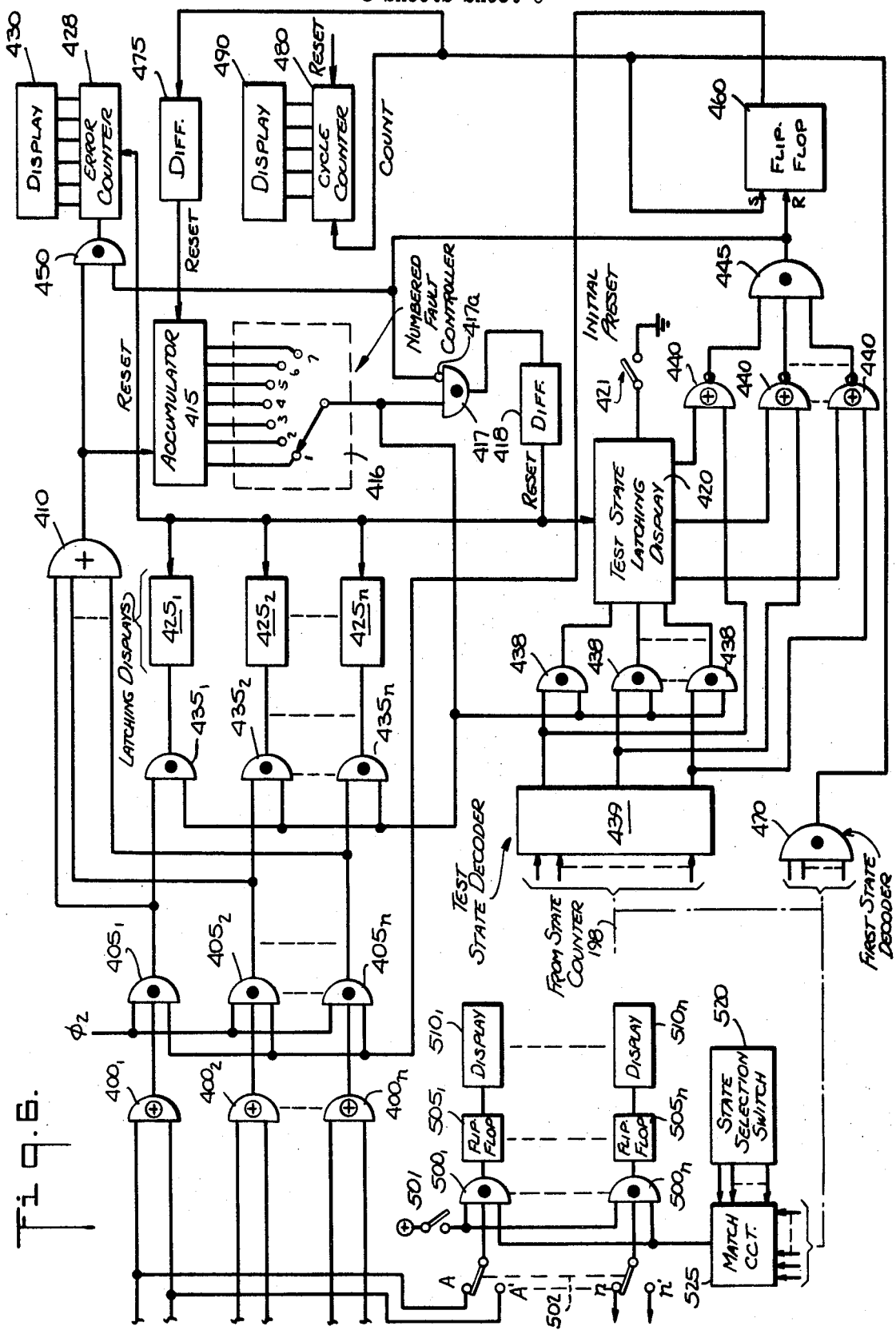
Figures 7, 8, 10:
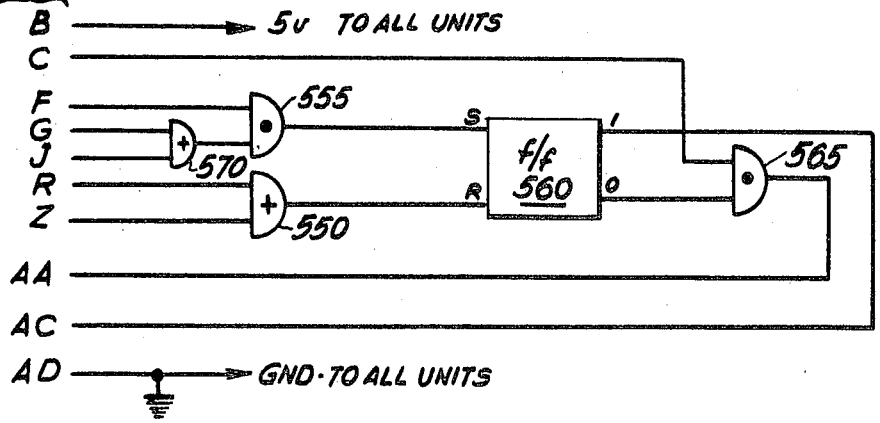
FIG. 7 illustrates a relatively uncomplicated electronic assembly to be tested by the arrangement of FIGS. 1 through 6.
FIG. 8 comprises a table showing a portion of a sequence of test signals for exercising the array of FIG. 7.
FIG. 10 depicts the spatial relationship of FIGS. 1 through 6.

Referring now to FIGS. 1–6 arranged as in FIG. 10, there is shown a programable arrangement for testing and identifying faults, if any, in any digital electronic assembly, e.g., an array of integrated circuit packages and passive and active components mounted on a printed circuit board. Two sockets 360 and 360' are provided to accept the electrical terminals of a like pair of such board, or any other electrical assembly.

Figure 1:
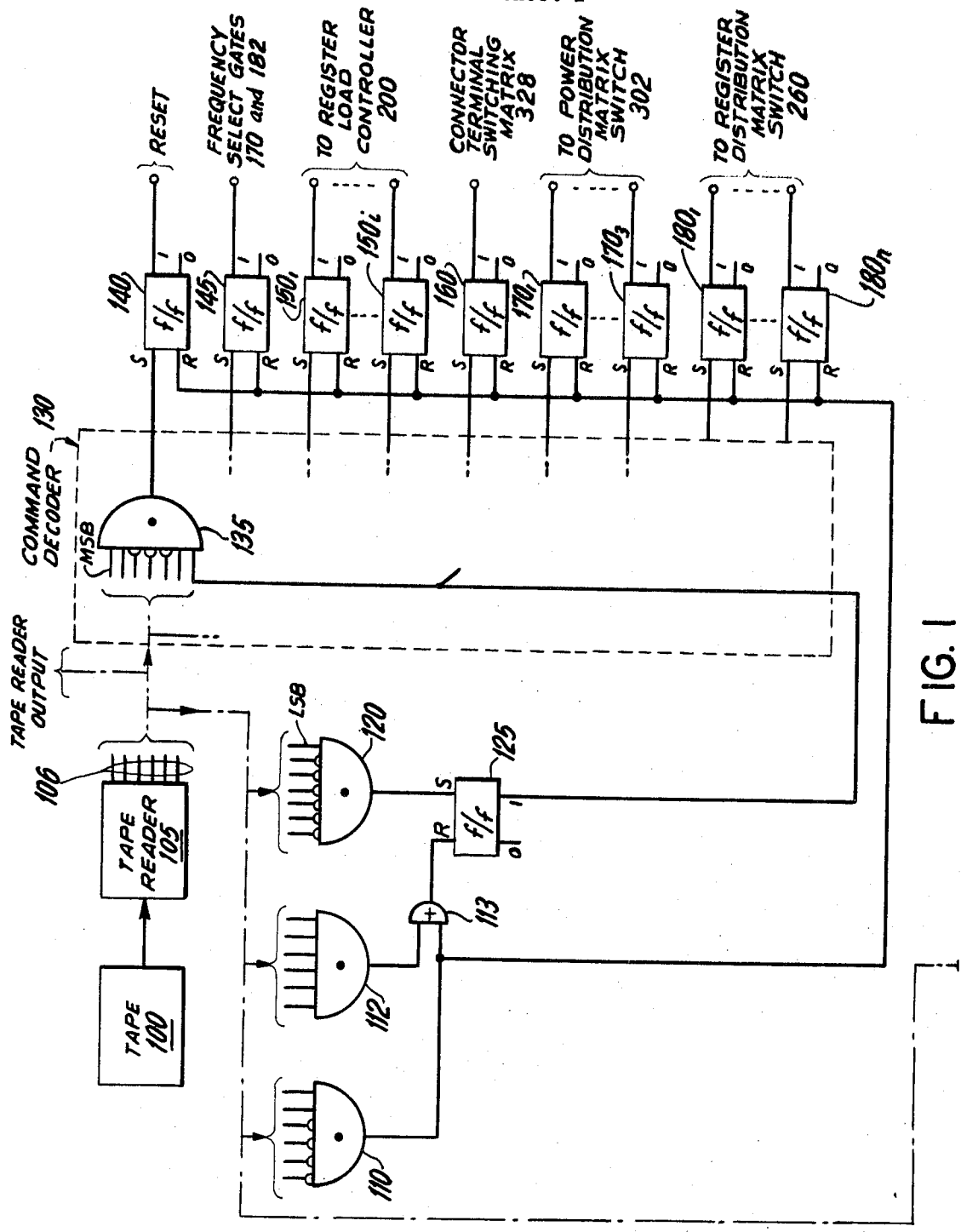
FIGS. 1 through 6 depict an illustrative programed electronic array testing arrangement embodying the principles of the present invention.

Loading of the Test Parameters (FIG. 1)

As shown in FIG. 1, the arrangement includes a tape 100 having stored thereon a plurality of instruction and data words, e.g., arranged for parallel reading. Digital information on the tape 100 is supplied to, and read by a tape reader 105 which supplies data in parallel form via a multiple conductor cable 106 to a command decoder 130 of any construction, e.g., formed of a plurality of multiple input AND logic gates. The output terminals of the command decoder 130 are supplied to the set terminals of a plurality of flip-flops 140, 145, $150_1$–$150_i$, 160, $170_1$–$170_3$ and $180_1$–$180_n$, with only one of these flip-flops being set responsive to any command word supplied from the tape to the decoder.

One digital word read by the tape reader 105, e.g., the word 000001, is adapted to enable the command decoder 130, and an AND gate 120 has its input terminals selectively inhibited as shown to yield a realtively high voltage output to set a flip-flop 125 only when that particular word is supplied at the output of the reader 105. The output of the flip-flop 125 is required before any command can be decoded, this being effected by enabling one input to each of the instruction decoding AND gates. This is shown for an instruction decoding AND gate 135 in FIG. 1 which is adapted to set a flip-flop 140 when and only when the flip-flop 125 has been set responsive to the tape supplying the word 000001, and next supplying the instruction 110001 in accordance with the input lead inhibiting pattern shown. Thus, an operation code as distinguished from a data word is identified on the tape 100 as comprising a two digital word sequence formed of the special control word 000001 to set the flip-flop 125, followed by the particular operation code desired. The special word 000001, in common with other special control words 111111 and 000011 discussed below, are uniquely distinguished from data words stored on the tape by including a binary 1 as their least significant digit.

After an operation instruction has been decoded by the decoder 130, and data words are to follow, the data words are typically preceded by another special word, e.g., 000011. This instruction is decoded by an AND gate 110 which is fully enabled by this special word to reset the flip-flop 125 acting through an OR gate 113, thereby inhibiting the command decoder 130 from interpreting the following data as operation codes until the flip-flop 125 is again enabled by an output 000001 from the reader 105.

The output from the enabled AND gate 110 also serves to reset all of the command storing flip-flops 140, 145, $150_1$–$150_i$, 160, $170_1$–$170_3$ and $180_1$–$180_n$.

An AND gate 112 is adapted to decode a third special instruction, e.g., 111111 for resetting the flip-flops 125 via the OR gate 113 thus disabling the command decoder 130. However, unlike the output of the enabled AND gate 110, the AND gate 112 does not reset the decoder output flip-flops.

To illustrate the operation of the FIG. 1 apparatus for an illustration instruction sequence, e.g., an instruction 110001 to initialize the apparatus of FIGS. 1–6 as by resetting all flip-flops, latched relays and the like at the beginning of a new test operation, the tape 100 stores, and the reader 105 supplies, in sequence, the three digital words 000001, 110001, 000011. The first command 000001 is recognized by the AND gate 120 which sets the flip-flop 125 thus enabling the decoder 130. The next instruction 110001 is decoded by the decoder gate 135 and sets the command preserving flip-flop 140. The relatively high voltage at the output of the flip-flop 140 performs all the necessary resetting operations, e.g., supplies a resetting voltage to flip-flop reset terminals, and actuates normally closed relay contacts to interpret latching relay energization paths. The following 000011 instruction is decoded by the AND gate 110 which resets the flip-flop 125, thereby disabling the decoder 130. The AND gate 110 also resets the previously set flip-flop 140 (assuming this is desired, i.e., that the next following word on the tape is a data word rather than an instruction, and that the data word does not require for proper operation a high voltage on the output of the flip-flop 140). Alternatively, 111111 may be employed in place of 000011 to disable the decoder 130 without resetting the flip-flop 140.

Switching Factors

Figure 2:
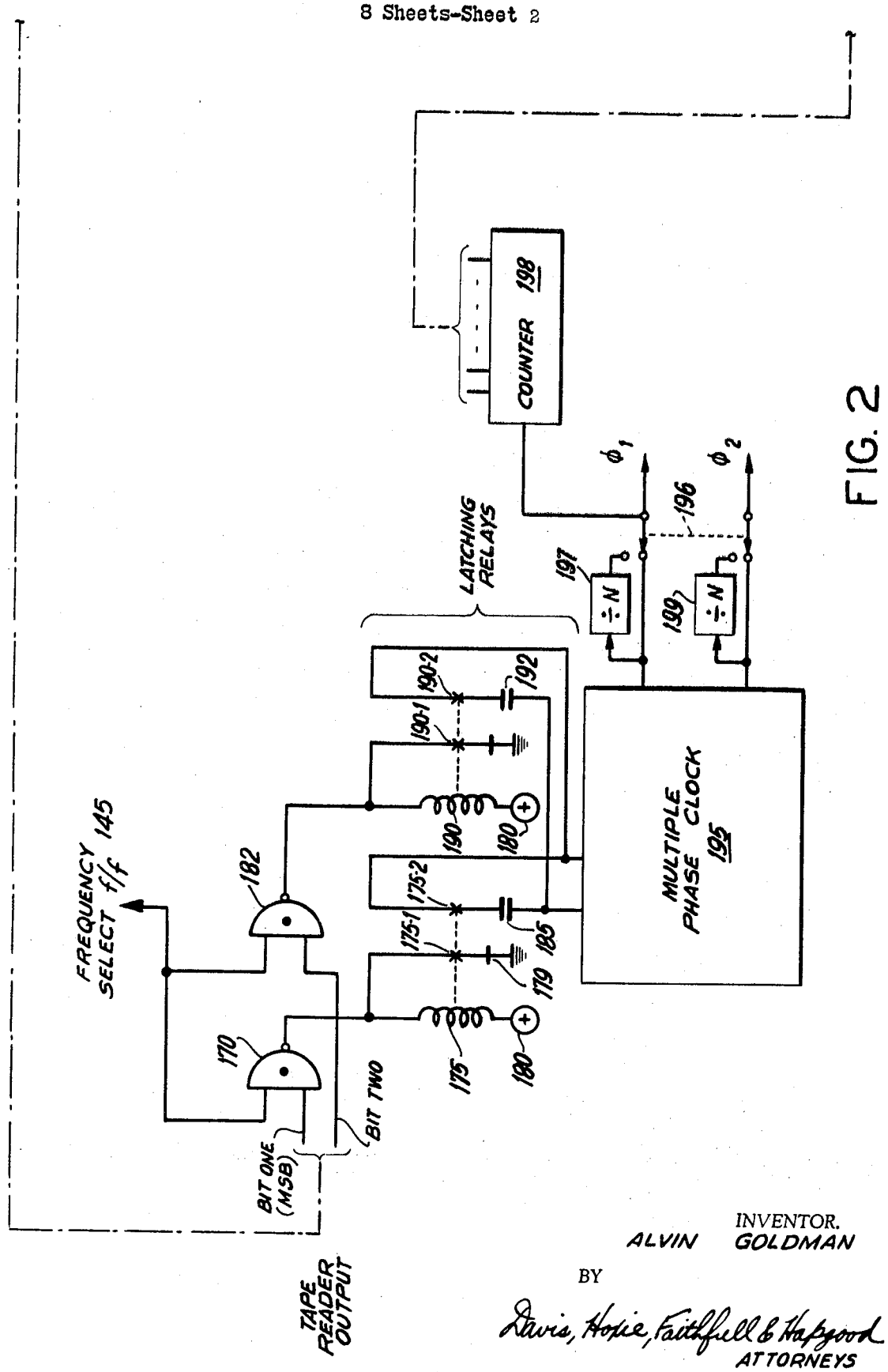

During the initial portion of operation for the FIGS. 1–6 system, certain switching connections and operational parameters must be established in accordance with the particular integrated circuit array (board) to be tested. These switching factors include, for example: (1) a choice of output frequency for a multiple phase clock 195 (FIG. 2); (2) a particular array of connections between circulating data registers 250 and the terminals of the test sockets 360 and 360', this being accomplished by matrices 260 (FIG. 4) and 328 (FIG. 5); and (3) setting of a power distribution matrix 302 (FIG. 5) to apply voltage levels and ground to appropriate connector terminals.

Cycle Time Selection (FIG. 2)

To establish the clock frequency, a command is supplied to the decoder 130, and a corresponding recognition gate in the decoder sets the flip-flop 145. The set flip-flop 145 partially enables two NAND gates 170 and 182 shown in FIG. 2 (assuming only two frequencies are desired — this may be increased at will). Following the selected frequency command, the command decoder 130 is disabled and without resetting the flip-flop 145 (the 111111 command). The next following tape output from the reader 105 is supplied as additional inputs to the NAND gates 170 and 182. More specifically, only one bit, e.g., the first bit is supplied to the NAND gate 170 and the second bit is supplied to the NAND gate 182, there being a digital 1 in either the first or second bit and not in both. Assuming that bit one was a digital 1, the NAND gate 170 (but not the NAND gate 182) switches and energizes a relay winding 175. This closes a contact pair 175-2 to operatively connect a capacitor 185 into the oscillator of the multiple phase clock 195 to determine the output clock frequency which depends in any known manner upon the value of the capacitor 185. Specific embodiments for the multiple phase clock 195 are well known, and the clock 195 is adapted to supply at least two output pulse trains $\phi_1$ and $\phi_2$ separate in phase, e.g., by 180 electrical degrees.

An additional normally open contact pair 175-1 is employed to latch the relay 175 in a standard manner, acting through a normally closed reset contact pair 179. The contacts 179 are operated by a master reset relay (not shown) which, in turn, is activated by the system resetting flip-flop 140 at the beginning of a cycle of operation, with the contacts 179 thus being selectively operative to restore the relay contacts 175 to their quiescent open state. Correspondingly, if the second data bit has been a 1 rather than the first (most significant) data bit, the relay 190 would have been operated and the capacitor 192 connected into the oscillator of clock 195, thereby adjusting the frequency of the clock 195 in accordance with the capacitive value of the element 192. Obviously, any other number of capacitors could be included to provide a spectrum of frequencies for the clock 195.

Further, ganged switching contacts 196 are provided to selectively connect pulse dividers 197 and 199 to the $\phi_1$ and $\phi_2$ output clock phases, respectively, thereby reducing the frequency outputs thereof by a factor of two orders or magnitude. This optionally provides for low speed testing which gives rise to certain faults not detectable at higher clock rates. High speed testing has the advantage of tending to detect transient faults. Low speed testing has the advantage of detecting faults which tend to appear when a capacitance or inductance has been charged or loaded.

Figure 4:
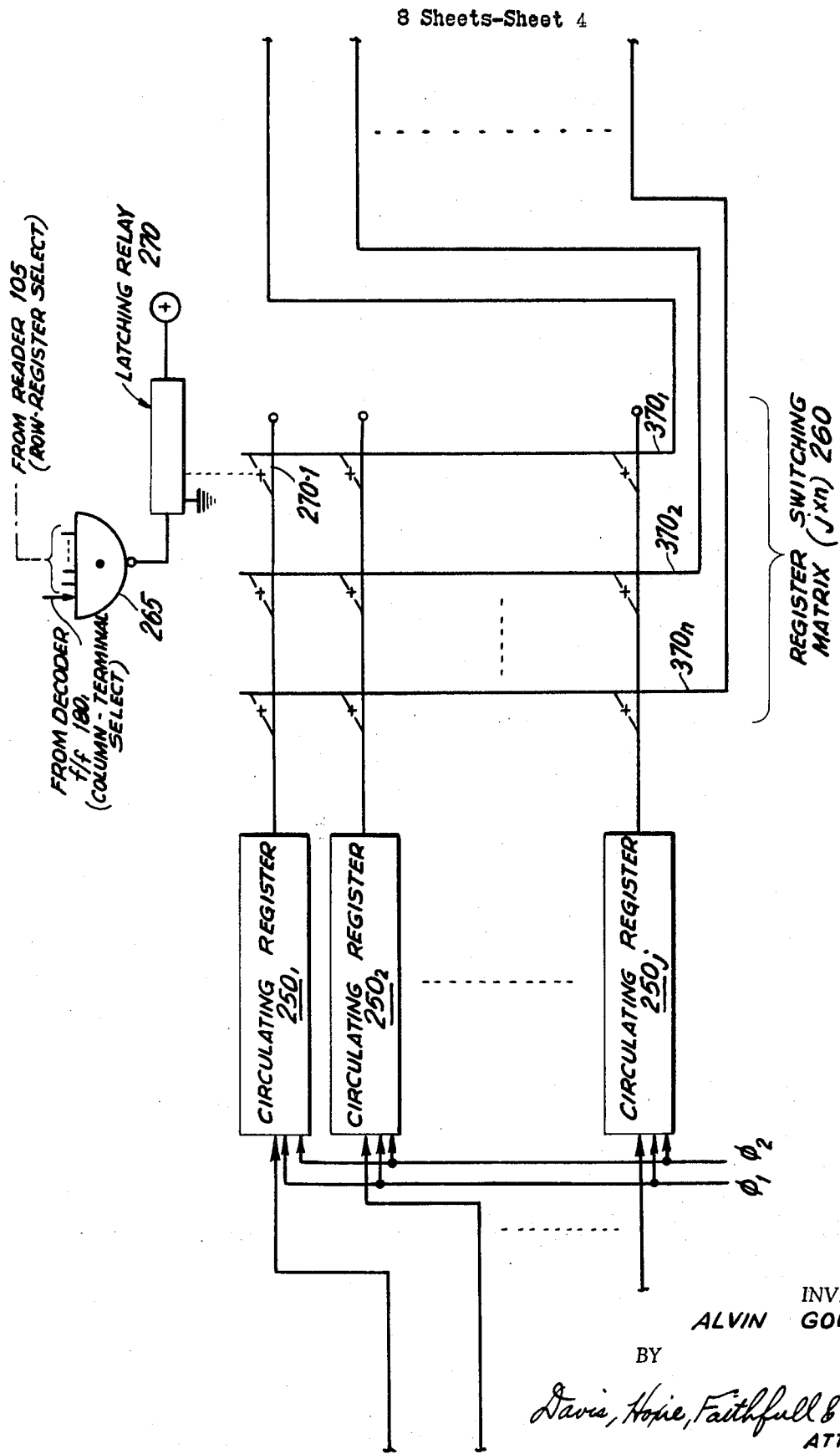

Connecting Data Registers to Board Input Terminals (FIGS. 4 and 5)

Figure 3:
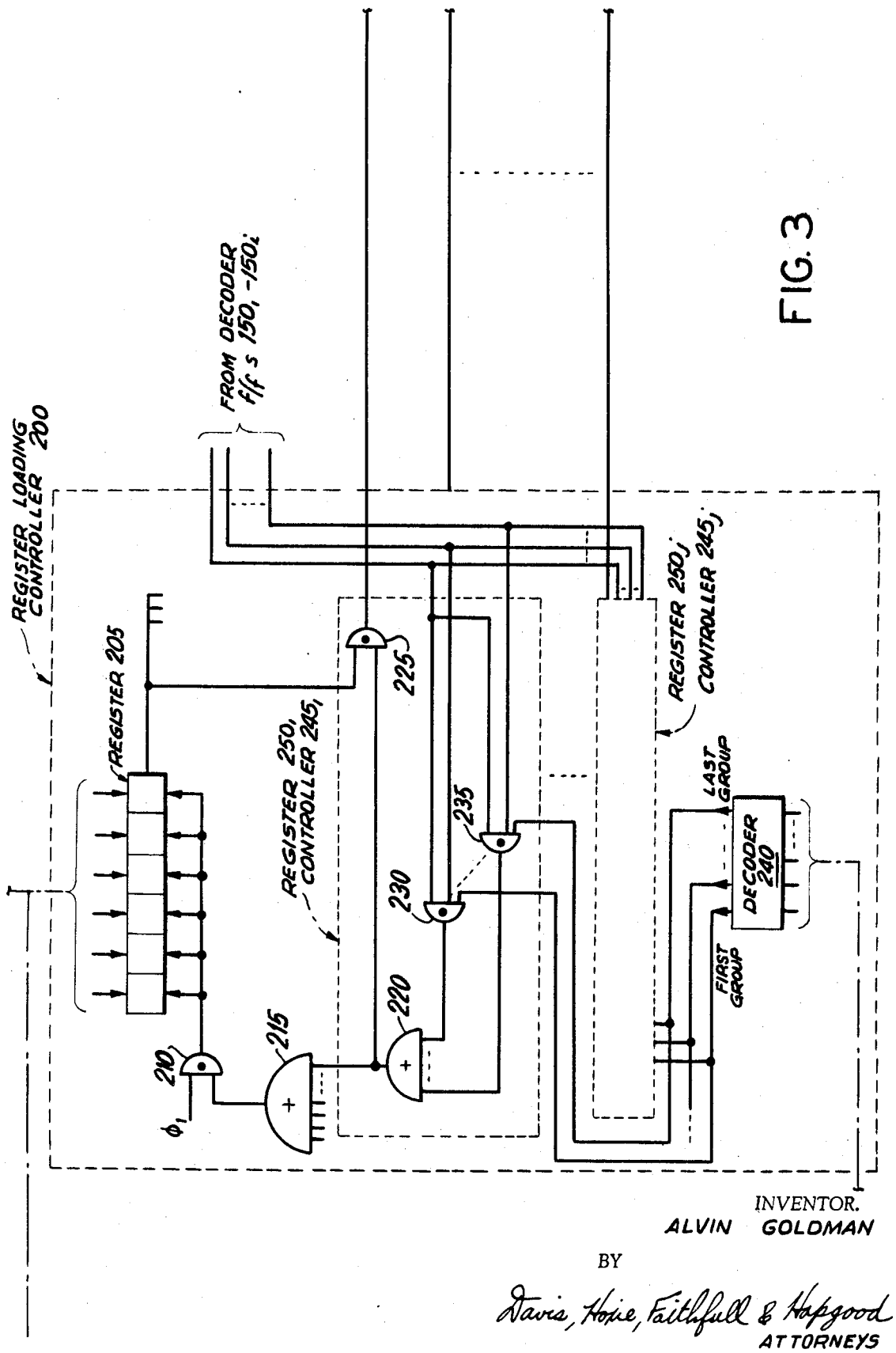

In the manner to be discussed below, test data is supplied from the tape 100 to a plurality of circulating data registers $250_1$–$250_j$ via a register data loading controller 200 (FIG. 3). Data in circulating registers $250_1$–$250_j$ is cyclically sequenced by the clock phases $\phi_1$ and $\phi_2$, and the parallel digital word at the outputs of the registers 250 forms the data inputs to exercise the input terminals of the integrated circuitry under test.

The sockets 360 and 360' each include a plurality of terminals A, B, ... n and A', B', ... n' and connectors for receiving the electrical terminals of two identical integrated circuit boards or other electronic assemblies. The number of socket terminals n is advantageously greater than the number of circulating registers 250 for two considerations. First, some socket terminals will not correspond to data inputs for the boards under test, these boards in general having at least two power terminals and at least one output terminal. Also, the data registers 250 may be time shared, e.g., connected to a differing set of input terminals during different test runs.

Each of the operative terminals A, B, ... n and A', B', ... n' of the sockets 360 and 360' must be designed by the data on the tape 100 as a data input terminals, a data output terminal, or a power terminal and, if a power terminal, as connected to ground or to a particular voltage level. The connector switching matrix 328 (FIG. 5) first identifies each terminal of the sockets 360 and 360' as being an output terminal on one hand, or an input or power terminal on the other. Corresponding terminals of the sockets 360 and 360', e.g., the terminals A, A' are connected to the common terminals of a double pole double throw switch $340_1$ which comprises relay contacts of a latching relay 355 (see the configuration associated with the relay 175 in FIG. 2 for an illustrative latching arrangement).

The terminals A, A' in common with all other terminals, are quiescently designated as input or power lines and are connected via the switch $340_1$ (normally closed contacts 355-2 and 355-1) to a corresponding line $370_1$. The line $370_1$ is connected to a circulating register switching crosspoint matrix 250 in this nominal position. If the terminals A, A' in fact are input terminals, they are both connected to the output of the same one of the circulating shift registers $250_1$ through $250_j$. This, during operative testing, the terminals A, A' will in every case receive the same input signal. As more fully disclosed below, circuit faults are detected when the outputs from the circuit boards connected to the sockets 360 and 360' differ though the same input data is supplied to the boards which are of like construction.

Still assuming the terminals A, A' to be functional input terminals on the subject circuit boards, and further assuming that the leads are to be connected to the input register $250_1$, a register matrix crosspoint switch $270_1$ (FIG. 4) is operated under program control. In particular, during that portion of the tape 100 reading when the register switching matrix 260 is set, the command decoder 130 operates the flip-flop $180_1$ thereby partially enabling a NAND gate 265 shown in FIG. 4, also partially enabling other similar NAND gates associated with the matrix column line $370_1$. Following this operation code and a 111111 control word, a data word is supplied to each of these NAND gates. Since the lead $370_1$ is to be connected to the shift register $250_1$, only the NAND gate 265 is adapted to switch the particular data word. The switched gate 265 energizes a relay 270 thereby effecting the appropriate connection of the register $250_1$ and the lead $370_1$ via contacts 270-1. Thus, the latched relay 270 provides a connection between the output of the shift register $250_1$ and the socket terminals A, A' for the duration of the testing process.

If the terminals A and A' are to be connected to power or ground, e.g., to a 5 volt source 300 in FIG. 5, the appropriate switching is accomplished by a power distribution matrix 302. To effect this connection, a command is given by the tape 100 and reader 105, and decoded by the decoder 130 to set one of the power distribution flip-flops, e.g., the flip-flop $170_1$. This is followed by a 111111 instruction disabling the command decoder 130 while the flip-flop 170 remains set, and a data word which identifies the terminals A, A' of the sockets. In a manner analogous to the operation of the register switching matrix 260 given above, coincidence of the enabled flip-flop $170_1$ and the signals identifying the terminals A, A' fully enable a NAND gate 303 thereby energizing a latching relay 304. Normally open relay contacts 304-1 are thus closed and effect the desired connection between the source 300 and the terminals A, A'. As before, there are n crosspoint circuits similar to the arrangement 303–304 for connecting the 5 volt source 300 to each of the lines 370 when appropriate.

Similarly, the power distribution matrix 302 includes contacts 320-1 and 311-1 for connecting the leads A, A' to a 24 volt source or to ground under control of the tape 100 when appropriate, and for similarly connecting each of the other terminals of the sockets 360 and 360' to any source.

Input and Output Selection

The terminals A and A', when dealt with as input terminals, receive identical data and are therefore connected together. When the terminals A and A' are dealt with as output terminals, their outputs must be dealt with separately in a comparing circuit.

Therefore, the terminals A and A' can be disconnected from each other, and connected to separate input terminals of an exclusive OR (modulo-2) gate 400 (FIG. 6) under control of the connector terminals switching matrix 328. To effect such a connection, i.e., to designate the terminals A and A' as being signal output terminals, an operation code is supplied to the decoder 130 to set the flip-flop 160. This is followed by 111111 to disable the decoder 130, and further followed by a data word to designate the terminals A, A'. The set flip-flop 160 and the A, A' terminal designating data word switch NAND gate 350 and operate the latching relay 355. This closes contact 355-3 and 355-4 and opens the normally closed contacts 355-1 and 355-2, therby connecting the terminals A and A' to the exclusive OR gate $400_1$. The contacts 355-2 and 355-3, and 355-1 and 355-4 may comprise two transfer form C arrangements.

It will be appreciated that each of the remaining socket terminal pairs B, B' through n, n' may similarly be connected to power, any circulating register 250, or to an Exclusive OR gate 400 by apparatus similar to that given above for the terminals A, A'. In particular, the register switch matrix 260 includes j·n crosspoint latching switch combinations similar to the arrangement 265–270 each exhibiting a different coded pattern of input signal leads; the power distribution matrix 302 includes 3·n NAND gate decoders and latching relays; and the connector switch matrix 328 includes n NAND decoders and latching relays.

Error Detecting (FIG. 6)

The operative output testing equipment is shown in FIG. 6, and like output terminals (A, A', ... n, n') are selectively connected to the inputs of associated Exclusive OR gates $400_1$, ..., $400_n$. Each Exclusive OR gate 400 generates an output signal if and only if the input signals on the two input leads thereto differ, i.e., either one is a 1 while the other is a 0. This combinatorial function is also called modulo-2 logic.

Gates 400 having inputs not operably connected, i.e., associated with socket terminals which are functional input or power terminals, or associated with terminals not used by a particular board, are inoperative during the testing cycle, i.e., they supply no fault indicating output signals. No output switching matrix is provided to reduce the number of gates since the excess Exclusive OR gates are likely less expensive than the switching matrix. Such switching may be provided if desired, however.

The basic philosophy underlying testing of the subject electrical circuit boards is that corresponding output terminals from the sockets 360 and 360' should have the same signals thereon since the boards are of the same type, and since the same pattern of input signals is supplied, at the same time, to the input terminals of the boards. Accordingly, when one of the Exclusive OR gates 400 develops an output signal for an appreciable portion of a data testing interval, after transients have abated, this indicates that the two boards are developing different output signals for the same input signals. Accordingly, one of the boards is operating improperly and thus contains a fault. To identify faults, the output of the Exclusive OR gates is strobed by the clock phase $\phi_2$ (the latter portion of the data cycle) such that the output of a plurality of strobbed AND gates 405 connected to the Exclusive OR gates 400 will supply an output only if an error has occurred after sufficient time has elapsed for the circuits under test to stabilize. This prevents a fault indicator (error) signal from being developed by an Exclusive OR gate 400 and an AND gate 405 responsive to an output terminal at one of the boards 360 or 360' changing slightly more rapidly than the corresponding other output terminal.

The fault detection and display circuit 400–495 will normally automatically search for the earliest fault in the test cycle and display to the test operator which test state in the test cycle stimulates the fault. The display also indicates the terminal or terminals of the board on which the error (fault indicator) signal is developed. A series of counters is employed to indicate whether the fault is a fixed or an intermittent malfunction.

A first test state decoder 470 is simply a multi-input AND gate which responds to the pattern of outputs from the set of circulating registers during the first test state of the series of test states that provide a single test cycle through the registers. During this first test state an output from the AND gate decoder 470 does three things. First, it is applied to a differentiating circuit 475 in order to provide a brief resetting pulse that clears the accumulator 415 and thus frees the accumulator 415 to respond to an error signal as described below. Second, the decoder 470 output provides a count of the cycle counter 480. The cycle counter 480 thus receives an input once during each cycle; namely, at the beginning of each cycle, and thereby provides a count of the number of test cycles that are applied to the circuit being tested. Third, the output of the first test state decoder 470 is applied to set the flip-flop 460 thereby providing an output from the flip-flop 460 which in turn enables the set of AND gates $405_1$ through $405_n$ (hereinafter 405). These AND gates 405 remain enabled as the test states in the cycle proceed until disabled, which disabling will occur, as described below, when the first error signals appears during the cycle. In order for this operation to occur properly, it is important that the exercising or testing of the array start at the beginning of a cycle of output signals from the set of circulating registers.

At the beginning of a test procedure, the initial preset switch 421 is actuated and as a result the test state latching display 420 is set to the number of the last test state in the circulating registers. The contents of the last state are not employed for testing. But the preset of display 420 makes sure that there is no false output from the display 420.

a. The First Fault Indication Signal During A Test

If a fault produces an error signal, this fault indicating signal, which may appear on more than one line, appears as outputs from the Exclusive OR gates $400_1$ through 400ₙ (generically 400) and is applied through normally enabled AND gates 405 and then through an OR gate 410 to be stored as a count in the accumulator 415. The numbered fault controller switch 416 is normally initially set, as shown, to number 1 position. In this position, the first error that occurs will be passed on as a signal to the AND gate 417 and will be processed and displayed. This normally enabled AND gate 417 passes the signal on to a differentiating circuit 418. The differentiating circuit 418 responds to the leading edge of the error signal pulse to provide a brief reset pulse. This reset pulse assures that the display units 420, 425 and error counter 428 are properly cleared or preset as the case may be. Specifically, the reset pulse (a) clears counter 428, (b) turns off the individual lights, one on each line, that constitute the display 425, and (c) clears the test state latching display 420.

The error signal persists substantially beyond the duration of the reset pulse and thus the error signal is available and the AND gate 450 for application to the error counter 428. The AND gate 450 is enabled (as described below) prior to the termination of the error signal pulse and thus the error counter 428 will provide a count of one in response to this first error signal.

This error signal is also applied, from 1 terminal of the controller 416 to enable each of the AND gates 435. Thus those AND gates 435 which have an error signal input will have that signal applied through to a corresponding output line latching display 425. In this fashion, a display is provided indicating which of the output terminals of the integrated circuit array provide an indication of the fault.

This error signal from the 1 terminal of the controller 416 is also applied as an enabling input to the AND gates 438. The information input to the AND gates 438 is the output from a decoder 439 and provides an appropriate indication of which test state is being applied. The decoder 439 is employed because it converts the output from the state counter 198(see FIG. 2) to a form compatible with the test state latching display 420. Because the AND gates 438 are enabled by this error signal, the count, indicating which test state in the test cycle is being applied, is transmitted through to the test state latching display 420 in order to provide a visual indication of which test state in the cycle has produced the error signal.

The description of FIG. 6 up to this point has been directed to features that indicate the output terminals on which the first error appears and that indicate which test state in the cycle produces the first output error. If it is desired to latch onto the first output error in the cycle, then it is important that the next, if any, output error in the cycle be blocked from resetting and re-energizing the latching displays 420, 425. For this purpose, the outputs of the latching display 420 and the test state decoder 439 are compared by comparator gates 440 and when identical provide an output from AND gate 445 to reset the flip-flop 460 and thus disable AND gates 405.

When the first error signal is indicated on the test state latching display 420, the output of that latching display 420 will be numerically identical with the output of the decoder 439. The identity between these two outputs will cause each of the comparator gates 440 (designed as exclusive NOR gates) to have an output. The AND gate 445 will provide a compare pulse output only when each of its input terminals is provided with a signal. The AND gate 445 will provide an output, under this condition of coincidence between the decoder 439 and display 420, to perform two immediate functions. First, the output from the AND gate 445 is applied as a reset pulse to the flip-flop 460. The flip-flop 460 reset operates off the trailing edge of the compare pulse to cut off the output from the flip-flop 460 and disables the AND gates 405 at the end of the test state that provides this first error signal in the cycle. Accordingly, the next error signal, if any, in the cycle will not pass through the AND gates 405. In this fashion, only the first error signal output in a cycle is recorded or displayed. Second, the output from the AND gate 445 is applied to enable the AND gate 450 and apply the error signal to the error counter 428 and thereby provide a count of one.

The AND gate 445 output also is applied to the invert terminal 417a of the AND gate 417 for reasons (to prevent reset of counter 428) that are pertinent during the succeeding cycles of test.

b. Assuming A Catastrophic Fault As Cause of the First Error Signal

As indicated above, during the first cycle of test states, only the first error signal, if any, is recorded at the displays 420, 425. If the first error signal is due to a catastrophic fault, as contrasted with an intermittent fault, and the first error signal generated during each of the successive cycles of testing is in response to the same test state, then in each cycle the above-described procedure will in large part repeat. The cycle counter 480 will provide one additional count at the beginning of each cycle so that at the end of the test the cycle counter 480 will provide a count of the number of cycles during the test. Furthermore, the error counter 428 will provide one additional count each time that this particular catastrophic failure producing error signal occurs. As a consequence, the count at the end of the test in the error counter 428 will equal the count on the cycle counter 480 and this will provide an indication that the fault detected is catastrophic and not intermittent.

One important difference in circuit operation during subsequent cycles is that the test state latching display 420 provides an output matching the test state decoder 439 output at the beginning of the test state that produces the error signal. Thus the AND gate 445 provides a compare pulse output to disable the AND gate 417 before an error signal is applied to the AND gate 417. This performs the important function of preventing reset of the error counter 428 during subsequent cycles.

c. Assuming An Intermittent Fault As Cause Of The First Error Signal

By contrast, if the error signal generated is due to an intermittent fault, the large number of cycles of test states will generally provide a situation where the error signal is not always generated during each cycle. In any particular cycle where the error signal does not occur, there will be no error signal input to the AND gate 450 and thus the error counter 428 will not provide a count during that cycle. A comparison of the error counter 428 reading and the cycle counter 480 reading at the end of the test will show that the fault was an intermittent fault because these two counter readings will be different.

Now assume that, on some subsequent cycle, the first error in that subsequent cycle is at an earlier test state than was the test state that produced the error during the first cycle. The result will be that the sequence described above will essentially repeat. But the error signal applied through the AND gate 417 will provide a reset pulse to clear the display 425, preset the display 420, and clear the error counter 428. Thus this earlier test state produced error signal occuring at a later cycle will wipe out the result of the later test state, earlier cycle produced error signal. In this fashion, at the end of the test, the displays 420 and 425 will provide an indication of the earliest test state which provided an error during any of the large number cycles of test states to which the array is exercised. Similarly, the error counter 428 will indicate how many times that particular earlier test state produced error occurred during the course of the test. This knowledge, in the light of the particular program for the array, will provide specific information to the operator from which he can either diagnose the source of the error or, more likely, proceed to further testing.

d. Further Testing

This further testing may involve a change in the setting of the accumulator 415. For example, it may be desired to determine what is the second test state that produces any error signal, whether the signal be intermittent or catastrophic. In that case, the movable arm of the numbered fault controller will be moved to position 2 and the accumulator 415 will not provide an output until it attains a reading of two. Similarly, a third, fourth, etc. error signal producing test state can be identified.

Test State Static Display

As a further aid in identifying the location of a circuit board fault, apparatus is provided to enable an operator to statically view the outputs of the terminals A-$n$, or A'-$n'$ at any test state. To effect this, the operator adjusts a state selection switch 520 to identify a particular test state by developing a binary representation of the state number, e.g., set switch 520 to develop a parallel binary word 00001001 to identify test state 17, and then closes a switch 501 to partially enable AND gates $500_1$ through $500_n$. Also, ganged switches 502 are set to select either the leads A-$n$ or A'-$n'$. The test state count for each cycle is developed in the counter 198 (see FIG. 2) and is supplied to a match circuit 525 as are the outputs from the state switches 520. When an exact identity is recognized, indicative of the desired test data state being impressed on the subject boards, the match circuit 525 further partially enables the AND gates $500_1$ through $500_n$, thereby selectively setting a plurality of flip-flops $505_1$–$505_n$ depending upon the data at the selected terminals A-$n$ or A'-$n'$. A plurality of $n$ displays $510$–$510_n$ thus indicate the digital state of each of the $n$ test points. Alternatively, connections may also be provided by the switches 502 to view the output of the registers 250 at any state.

Loading Programmed Word Into Shift Register (FIGS. 3 and 9)

Finally, the arrangement of FIGS. 1 through 6 provides a register 250 loading comtroller 200 (FIG. 3) for selectively impressing data from the tape 100 and tape reader 105 in the appropriate data circulating shift registers. To illustrate the loading of the circualting shift register $250_1$, which is illustrative of all registers 250, the tape reader 105 first supplies a sequence of commands to the decoder 130 to set a given subset of the decoder output flip-flops $150_1$–$150_n$ to identify the first portion (e.g., first six bits) of the register $250_1$. The next following data word read by the reader 105 with the decoder 130 disabled but with the flip-flops $180_1$–$180_n$ retaining their set and reset status, is passed to a register 205 in parallel form.

The particular decoder flip-flops $150_1$–$150_i$ having high output voltage identifying the first portion of the register $250_1$ are passed to, and partially enable an AND gate 230. A data state decoder 240 has as inputs thereto the output of the register data state counter 198, with the outputs of the decoder 240 respectively identifying the first (e.g., first six bits) through last cyclic portions of all circulating shift registers 250. Accordingly, when the first portion of the circulating data cycle arrives (a proper timed position for data input for the assumed example), the relatively high voltage from the decoder 240 fully enables the AND gate 230 which energizes one lead of an AND gate 210 via OR gates 220 and 215. Accordingly, the next sequence of $\phi_1$ clock pulses shifts data through the register 205 and into the circulating shift register $250_1$ via an AND gate 225 which also receives signals from the OR gate 220. Similarly, logic gates 235, 220, 215, 210 and 225 are employed to insert the final data bits into the circulating register $250_1$.

The circuit elements in the loading controller 200 unique to control of the circulating shift register $250_1$ are included in a dashed register $250_1$ controller $245_1$. Similar controllers 245 operative in conjunction with the common decoder 240, OR gate 215, AND gate 210, and register 205 are included in the overall controller 200 for each of the remaining circulating shifting registers $250_2$ through $250_j$.

Alternatively, the circulating shift registers $250_1$ through $250_j$ may comprise a plurality of fixed storage registers (e.g., flip-flops) $250'_1$ through $250'_j$ (FIG. 9), and a plurality of AND gates 280 for sequentially gating out the output of the several register stages via OR gates $281_1$ through $281_j$. The AND gates 280 for any register grouping are driven by the outputs of a state decoder 283 which, in turn, are supplied with the output of the state counter 198. As before, the storage stages in the register $250_i$ and $250_j$ have data inserted therein by AND gates 290 which are driven by output signals from a combination of the flip-flops $150_1$–$150_j$ and by data signals from the tape reader 105.

Operating Example

To illustrate the operation of the electronic circuit testing of FIGS. 1 through 6, assume that the electronic circuit of FIG. 7 is to be tested, this circuit typically being mounted on a printed circuit board having electrical output terminals as lettered corresponding to similarly lettered terminals on the sockets 360 and 360'. A test program is first written for the subject electrical array of FIG. 7, and thus is done without regard to the specific electronic function to be accomplished by this circuit board in its intended environment. In fact, knowledge of the function to be performed by this assembly may in some instances unduly bias the test program writer in his goal to an efficient testing program.

The initializing portion of the program has effectively been discussed above, and will be only briefly mentioned here. The first instruction should be 000011 to set flip-flop 125 and enable the command decoder and next follows the instruction 110001 to energize the flip-flop 140, thereby releasing all of the latched relays, if any, and also resetting all set flip-flops, if any.

After clearing the flip-flop 140, a command is provided to set the flip-flop 160, and the following list of data words respectively designate the socket terminals A, A' ... n, n' as output terminals, or input or power terminals. This designation is electrically effected by the connector terminal latching switching matrix 328. In accordance with the configuration of the board to be tested, two data words follow the command which sets the flip-flop 160 to identify the socket terminals AA and A'A', and AC and A'C' as outputs, these being the outputs of a flip-flop 560 and an AND gate 565 which are the only output signals generated by the circuit board under test.

The next command (all special clear instructions 111111 and 000011 are omitted from this discussion but selectively precede and follow operation codes and data words as appropriate) sets decoder flip-flop $170_1$ to impress 5 volt power on the cards, and this is followed by a single data word to identify the terminals B, B' which is thus connected to the source 300 by the matrix 302. Similarly, an appropriate command and data word are employed to the press ground on the leads AD, A'D'.

A sequence of commands followed by data words is employed to connect selected of the circulating shift registers $250_1$–$250_j$ to the leads C, F, G, J, R and Z (and the corresponding socket 360' terminals), these being the input leads of the boards under test. Connections for the remaining registers and power leads are irrelevant since there are no connections for these socket terminals on the boards.

The multiple phase clock 195 is set to an appropriate frequency by suitable command and data words, and commands and data words are supplied to next load the circulating shift registers $250_1$–$250_j$. The particular data words written on the tape and inserted in the circulating shift registers $250_1$–$250_j$ will vary with the ability of ingenuity of the programmer. An illustrative portion of a typical instruction sequence for the board under test is illustrated in the table of FIG. 8, and an $x$ indication in the table comprises a "don't care" condition which can assume any value.

For circulating data state 1, R,R' is made 1 and F, F' and 0 such that the flip-flop 560 on each board is reset by an OR gate 550 to initialize the card. C, C' is made a 1 during the first state and thus the AND gate 565 will be partially tested during state 1 and a fault indication will develop if the output on either lead AA, A'A' is an 0 during this time. Similarly, a fault will be effected if AC or A'C' is a 1 since the flip-flop 560 should be reset. During the second data circulating state, all inputs remain the same except that a 0 is applied to the C, A' leads. The gate 565 is further tested and the AA, A'A' leads should both got to 0 if the gate 565 is operating properly. During test state 3, F, F' and G, G' are made 1, and R, R' and Z, Z' are set to 0 to switch and set the flip-flop 560, 0 and 1 being respectively supplied to the leads AA, A'A' and AC, A'C' for proper operation. During interval 4, conditions remain the same except that C, C' is made a 1 and this should have no effect on the output lead AA, A'A', and a fault results if there is such an effect. Similarly, many other tests are made for the remainder of the testing states, each of the various logic and storage elements on the boards being tested by varying combinations and sequences of input signals. By this mode of action, leads on the circuit board of FIG. 7 not directly available for testing by an operator, e.g., the set and reset output leads of the flip-flop 560, may be exercised and checked for proper operation.

Alternatively, a pseudo random array of input data words may be employed to test the boards. This greatly simplifies programming for a board, but complicates fault recognition and detracts from the assurance that all circuit elements have been fully exercised and verified for proper operation.

After the testing data pattern and program have been written, the appropriate data entries are placed on the tape 100 and thence read into an appropriate one of the registers 250. For example, the C, C' input row 1001 ... (FIG. 8) may be placed in the register $250_1$; and F, F' row 0011 ... may be placed in the register $250_2$; and so forth. This flow of data from the tape reader 105 to the registers 250 is effected by commands and data words in the manner disclosed above.

After all initializing, lead and power switching and the like is completed, and all registers 250 loaded, two identical circuit boards are inserted in sockets 360 and 360' and testing begins (this may be controlled manually or by interlocked switching contacts actuated when both boards are in their sockets). For absolute tests, one of the boards comprises a standard known to be operative, and the outputs A'A' and A'C' of a second board are compared with the corresponding outputs AA and AC of the standard during each testing state, i.e., during each shift of data in the circulating registers 250. Alternatively, two boards to be checked may be inserted in the sockets 360 and 360', and the outputs therefrom compared by the circuitry of FIG. 6. This mode of testing relies upon the very high probability that two boards will not have identical faults.

The outputs from the terminals AA and A'A', and AC and A'C' are respectively supplied to two of the Exclusive OR gates 400. The outputs of the gates 400 supplied with these signals are examined during the $\phi_2$ portion of each testing cycle by the associated AND gates 405; which AND gates are enabled by the flip-flop 460. The initial preset switch 421 initially sets the test state latching display 420 at a number equal to the number of the last test state.

The Exclusive OR gates 400 not associated with the connector terminals AA, A'A' and AC, A'C' have no signals supplied thereto, and are inoperative with the duration of the card testing operation. When more intricate boards are tested, many more than two of the Exclusive OR gates would in general be actively employed.

If both boards in the socket 360 and 360' are fully operative and free from faults, the outputs at the socket terminals AA and A'A' and AC and A'C' will stabilize and be identical during the $\phi_2$ portion of each data shifting state. Accordingly, there are no outputs from the Exclusive OR gates 400, and no outputs from the AND gates 405. Thus, none of the fault indicating displays 420, 425 will supply a fault indication, and a zero fault count is displayed by the error counter 428. After a suitable number of test cycles (for example, 10,000)

which is indicated by the counter 480 and display 490, the testing automatically stops. The operator removes the boards having confirmed that they are operative. Since the circulating shift registers 250 are typically being stepped at a megacycle rate, many test runs are made within a second or so. Alternatively, the operator may thereafter connect the dividers 197 and 199 into circuit to reduce the clock rate, and test the boards at a low cyclic rate as well as at a fast rate. This will detect some faults which may not show up during high speed testing, e.g., where bad connections are masked at high frequencies by capacitive couplings.

Assume now that one of the boards have a catastrophic fault, e.g., has a faulty AND gate 565. Accordingly, on the very first test sequence after the flip-flop 470 is set, AND gate 565 would fail and the AA or A'A' output signal from the bad board would be a 0 rather than a 1. The Exclusive OR gate 400 comparing the terminals AA and A'A' would supply a 1 output voltage to enable the associated AND gate 405 since the inputs to the modulo-2 gate 400 would differ.

This output error signal from AND gate 405 will pass through the OR gate 410, to be stored in the first error position of accumulator 415. The numbered fault controller 416, being manually set to the first error detection position, will pass the error signal through the differentiator netword 418. The output signal from the differentiator 418 will clear all latches 420 and 425 of any previously inserted error display and will also reset error counter 428 to zero. Immediately after this reset, AND gate 435 will enable the initial error signal from exclusive OR gate 400 to set latching display 425 indicating that the AA lead has generated a fault. The same signal out of the numbered fault controller 416 will at the same time enable AND gates 438, thus test state number 1 of 100 test states in the test cycle will set the latching display 420. The operator now has displayed that output line AA had an error during the time of test state 1.

The coincident gating circuit made up of exclusive OR gates 440 and AND gate 445 generate a signal only during the time latching display 420 and state decoder 439 are at the same state. This coincident signal will initiate three functions: (1) enable AND gate 450 so that error signal out of OR gate 410 will be counted by error counter 428 and displayed to operator by 430, (2) reset flip-flop 460 which will inhibit all AND gates 405 from processing any other error signals that might occur during the remaining test states of the test cycle, and finally, (3) inhibit AND gate 417 and prevent response to the same test state error signal on succeeding cycles.

The operator then determines whether or not he can identify a particular fault on the board under test in accordance with the first fault indication. This identification may be left to the skill of the operator but is more readily accomplished by having the operator examine a fault look-up table prepared by the programmer who designed the test sequence of FIG. 8, each of these test states having special significance to the programmer. For the present example, note that a fault would develop in the circuit board of FIG. 7 during the first test state, and at the terminals AA, A'A' if the AND gate 565 were bad (the assumed case), but would also develop if the flip-flop 560 were inoperative. Thus, the look-up table supplied to the operator for FIG. 7 board might instruct the operator to look for a second or other subsequent faults on the board to gather more information for fault identification. Alternatively, since the fault is isolated to such a small area, it may be sufficient for efficient fault reparing to simply point out the specific problem areas to be examined.

If the fault is to be more particularly identified, the operator throws the numbered fault controller switch 416 to error number 2 position. This will set up the error detection circuit to respond to the second fault in any test cycle. If there is no second error in any of the succeeding test cycles, the error displayed, caused by the first error, will remain in the displays. But if there is a second error, then through the same error processing just described, the error data from test state 1 will be erased and the new error data will be displayed and counted. Depending upon the identity of this second fault information, the trouble on the board will be more closely localized and identified, e.g., to differentiate a fault in the flip-flop 560 (or its output conductor) vis-a-vis an inoperative AND gate 565. If desired, third or subsequent faults can be identified.

Once a circuit board has been identified as being faulty, and as a further aid to isolating the problem, the operator may examine the instantaneous digital values at the terminals A-$n$ or A'-$n'$ of the sockets 360 and 360' by suitably adjusting the ganged switches 502, the switch 501, and the state selector 520. Visual displays 510 will indicate the pattern of 1's and 0's present at the selected terminals. The particular data shifting state examined is determined by the setting of the state switch 520 in the manner described above.

For extremely complex boards, the serial capacity of the circulating shift registers 250 may not be sufficient to make all desired tests, or there may be insufficient registers to exercise all inputs. Accordingly, and assuming for example that the capacity of these registers 250 is 100 bits, 99 tests could be made on any or all inputs during any one loading of the shift registers 250. After these tests are run, new data could be inserted in the registers 250 in the manner described above. A new sequence of 99 test state could then be run on the same or other input terminals, this may continue until all desired testing has been completed.

When intermittent rather than catastrophic faults occur on a board, the error counter-display 428–430 yields an output which is less than the output of the cycle counter-display 480–490. Due to the large number of test cycles (e.g., 10,000 cycles) and the capability of the error detection circuit being able to replace the displayed intermittent error data occuring in a given test state by new error data occuring at any earlier test state in any succeeding test cycle, the error detection circuit will quickly and automatically find and display the first intermittent error occurring in the circuit under test.

The intermittent fault having been detected in this manner, the particular circuit fault giving rise to the intermittency may be determined in the same manner as previously described for catastrophic faults by examining the set of the various fault displays and use of look up tables. Thus the ability of this fault detection circuit to jump to a display of an earlier test state induced error on a later test cycle, makes it possible to use the same basic analysis for the location of an intermittent fault as is used for the location of a catastrophic fault.

Furthermore, known testing techniques for bringing out intermittent malfunction can be incorporated in the testing system. Testing under a range of temperatures, circuit vibrations or "G" loading, range of high or low supply voltages to circuit under test, humidity variations, or a combination of these environments, are some of the methods to cause a latent intermittent fault to occur.

Thus, the arrangement of FIGS. 1 through 6 has been shown by the above to be operative under program control to test any integrated circuit board or electronic assembly, the machine being loaded with a program designed for that board or assembly. Catastrophic and intermittent faults are detected, and output displays are generated to identify a particular board fault or to characterize the boards under test as being fully operative.

It is to be understood that the above-described arrangement is only illustrative of the principles of the present invention. Numerous modifications and adaptations thereof may be readily apparent to those skilled in the art without departing from the spirit and scope of the present invention.

For example, one board may be tested at a time, with the reference output data signals being loaded into selected ones of the circulating registers 250 (conceptual output registers). Accordingly, the socket terminal switching matrix 328 simply comprises at each column crosspoint a latched relay controlled transfer switch for connecting the associated socket terminal A-n to either one input of an Exclusive OR gate 400 or to one of the lines 370 (but not both), the relay also having contacts for connecting the second input of the gate 400 to the line 370 when the socket terminal is connected to the other gate terminal. Thus, an error modulo-2 logic comparison is made between the actual and expected output signals.

The above description has been of a test technique in which two arrays are used, exercised in the same fashion and their outputs compared to provide error signals, when one array has a fault. Obviously, the invention could be employed in connection with a standard array or a simulated standard array such as might be provided by a computer. However, the preferred embodiment employs two similar actual arrays because this provides certain advantages and makes the test operation easier to set up. In particular, the use of two actual arrays means that propagation delay on the circuit tested does not have to be calculated.

What is claimed is:

1. Apparatus for testing a multi-terminal logic circuit, having input and output terminals, to determine faults comprising:

data circulating means to provide a predetermined sequence of test state patterns, the data content of said data circulating means being programmed to provide said sequence of test state patterns as a function of the logic design of the circuit being tested to provide fault analysis data, said means (providing) continuously cycling through a plurality of cycles of said predetermined sequence of test state patterns, base comparison means to provide a sequence of sets of compare signals, said sequence of sets of compare signals corresponding to the sequence of sets of output signals from a fault free sample of the circuit under test when said sequence of test state patterns is applied to the input terminals of such a fault free sample, a plurality of compare gates, each of said gates having a first input adapted to be coupled to the output signal from a separate one of the output terminals of the logic circuit under test and having a second input coupled to a separate one of said compare signals, each of said compare gates providing a fault indicator signal when the corresponding output terminal signal and compare signal differ to provide a sequence of sets of fault indicator signals, each of said sets of said fault indicator signals being the set of fault indicator signals provided in response to one of said test state patterns where there are one or more fault indicator signals, indicator means synchronized to said data circulating means and responsive to a predetermined Nth set of said fault indicator signals to provide an indication of the step in a cycle of said sequence of test patterns which produces said Nth set of fault signals, means to cause the indication of said step which produces said Nth set of fault indicator signals to automatically jump to an earlier step indication if an Nth set of fault indicator signals is produced at an earlier step in a succeeding cycle of said sequence of test state patterns, hold means to hold a step indication corresponding to an Nth set of fault indicator signals throughout succeeding sets of fault signals and throughout succeeding cycles of said test state patterns until an earlier step of said pattern in a succeeding cycle produces an Nth set of fault signals, and release means to automatically release said hold in response to an earlier step indication of an Nth set of fault signals.

2. The apparatus of claim 1 wherein said Nth set of said fault indicator signals is a first set of said fault indicator signals.

3. The circuit testing apparatus of claim 1, further comprising:

counter means to provide a count of the number of occurrences of said Nth set of fault indicator signals, means to cause said counter to jump to the count of one when said indicator means jumps to said earlier step indication of an Nth set of fault indicator signals, to provide an indication of the fact of intermittent malfunction when said count is greater than zero and less than the number of cycles through which said data circulating means are run.

4. The apparatus of claim 3 wherein said Nth set of said fault indicator signals is a first set of said fault indicator signals.

5. The method of testing a multi-terminal logic circuit, having input and output terminals, to determine faults comprising the steps of continuously circulating a predetermined sequence of test state patterns through a plurality of cycles, the data content of said sequence of test state patterns being programmed to provide said sequence of test state patterns as a function of the logic design of the circuit being tested to provide fault analysis data, generating a sequence of sets of compare signals, said sequence of sets of compare signals corresponding to the sequence of sets of output signals from a fault free sample of the circuit under test when said sequence of test state patterns is applied to the input terminals of such a fault free sample, comparing the separate output signals from the logic circuit under test with corresponding ones of said compare signals, generating a fault indicator signal when the corresponding output signal and compare signal differ to provide a sequence of sets of fault indicator signals, each of said sets of fault indicator signals being the fault indicator signals generated in response to one of said test state patterns where there are one or more fault indicator signals, providing an indication of the step in a cycle of said sequence of test state patterns which produces an Nth set of said fault indicator signals, holding said step indication corresponding to said Nth set of fault signals throughout succeeding sets of fault signals and succeeding cycles of said test state patterns, releasing the hold on said step indication and causing said indication to jump to an earlier step indication if an Nth set of fault indicator signals is produced at an earlier step in a succeeding cycle of said sequence of test state patterns.

6. The method of claim 5 wherein said Nth set of fault indicator signals is a first set of fault indicator signals.

7. The method of claim 5 further comprising the steps of:

counting the number of occurrances of said Nth set of fault indicator signals, and jumping back to the count of one when said indication of said Nth set of fault indicator signals jumps to said earlier step indication of an Nth set of fault indicator signals.

8. The method of claim 7 wherein said Nth set of fault indicator signals is a first set of fault indicator signals.

* * * * *